(12) United States Patent
Sucato

(10) Patent No.: US 9,358,946 B2
(45) Date of Patent: Jun. 7, 2016

(54) SEATBELT LIFT MEMBER AND METHOD

(71) Applicant: Edward Sucato, Phoenix, AZ (US)

(72) Inventor: Edward Sucato, Phoenix, AZ (US)

(*) Notice: Subject to any disclaimer, the term of this patent is extended or adjusted under 35 U.S.C. 154(b) by 0 days.

(21) Appl. No.: 14/491,896

(22) Filed: Sep. 19, 2014

(65) Prior Publication Data

US 2015/0076806 A1    Mar. 19, 2015

Related U.S. Application Data

(60) Provisional application No. 61/880,085, filed on Sep. 19, 2013.

(51) Int. Cl.
*B60R 22/02* (2006.01)
*B60R 22/03* (2006.01)
*B60R 22/18* (2006.01)
*B60R 22/26* (2006.01)

(52) U.S. Cl.
CPC ............... *B60R 22/03* (2013.01); *B60R 22/18* (2013.01); *B60R 2022/021* (2013.01); *B60R 2022/1806* (2013.01); *B60R 2022/266* (2013.01)

(58) Field of Classification Search
CPC .. B60R 2022/021; B60R 22/03; B60R 22/18; B60R 22/26; B60R 2022/1806; B60R 2022/266
USPC .......................................................... 297/481
See application file for complete search history.

(56) References Cited

U.S. PATENT DOCUMENTS

| 3,841,658 | A | * | 10/1974 | Singh | B60R 22/02 297/474 |
|---|---|---|---|---|---|
| 4,687,254 | A | * | 8/1987 | Baumert | B60R 22/02 297/481 |
| 5,951,112 | A | * | 9/1999 | Hansson | B60R 22/00 280/801.1 |
| 8,215,796 | B2 | * | 7/2012 | Luo | F21V 15/00 315/320 |
| 2004/0207245 | A1 | * | 10/2004 | Baylis | B60R 22/02 297/481 |
| 2006/0255647 | A1 | * | 11/2006 | Hyatt | B60R 22/22 297/481 |
| 2007/0205651 | A1 | * | 9/2007 | Weinstein | B60R 22/18 297/482 |
| 2013/0126693 | A1 | * | 5/2013 | Khaitan | B60R 22/18 248/346.5 |

FOREIGN PATENT DOCUMENTS

| DE | 100 18 105 A1 | * | 11/2000 |
|---|---|---|---|
| EP | 1688324 A1 | * | 8/2006 |
| FR | 276521 A1 | * | 5/1996 |
| JP | 6-24291 A | * | 2/1994 |
| JP | 2011-105149 A | * | 6/2011 |
| JP | 2011-111136 A | * | 6/2011 |
| JP | 2012-1401191 | * | 7/2012 |
| WO | WO 2013/046815 A1 | * | 4/2013 |

* cited by examiner

*Primary Examiner* — Ruth Ilan
(74) *Attorney, Agent, or Firm* — Robert A. Parsons; Michael W. Goltry; Parsons & Goltry

(57) ABSTRACT

A seat belt lift member in cooperation with seat belts in an automotive vehicle including a vehicle seat having a seat belt well formed therein, a seat belt including two pieces of strap with a buckle attached to one end of one piece, and the buckle positioned in the seat belt well, and a seat belt lift member positioned in the seat belt well in contact with the buckle so as to raise the buckle at least partially out of the seat belt well and into an accessible orientation. The seat belt lift member is one of a pliable body positioned in and conforming to the shape of the seatbelt well and a housing positioned in the seat belt well and mounting the buckle and a release button so as to be accessible from one surface of the housing.

12 Claims, 3 Drawing Sheets

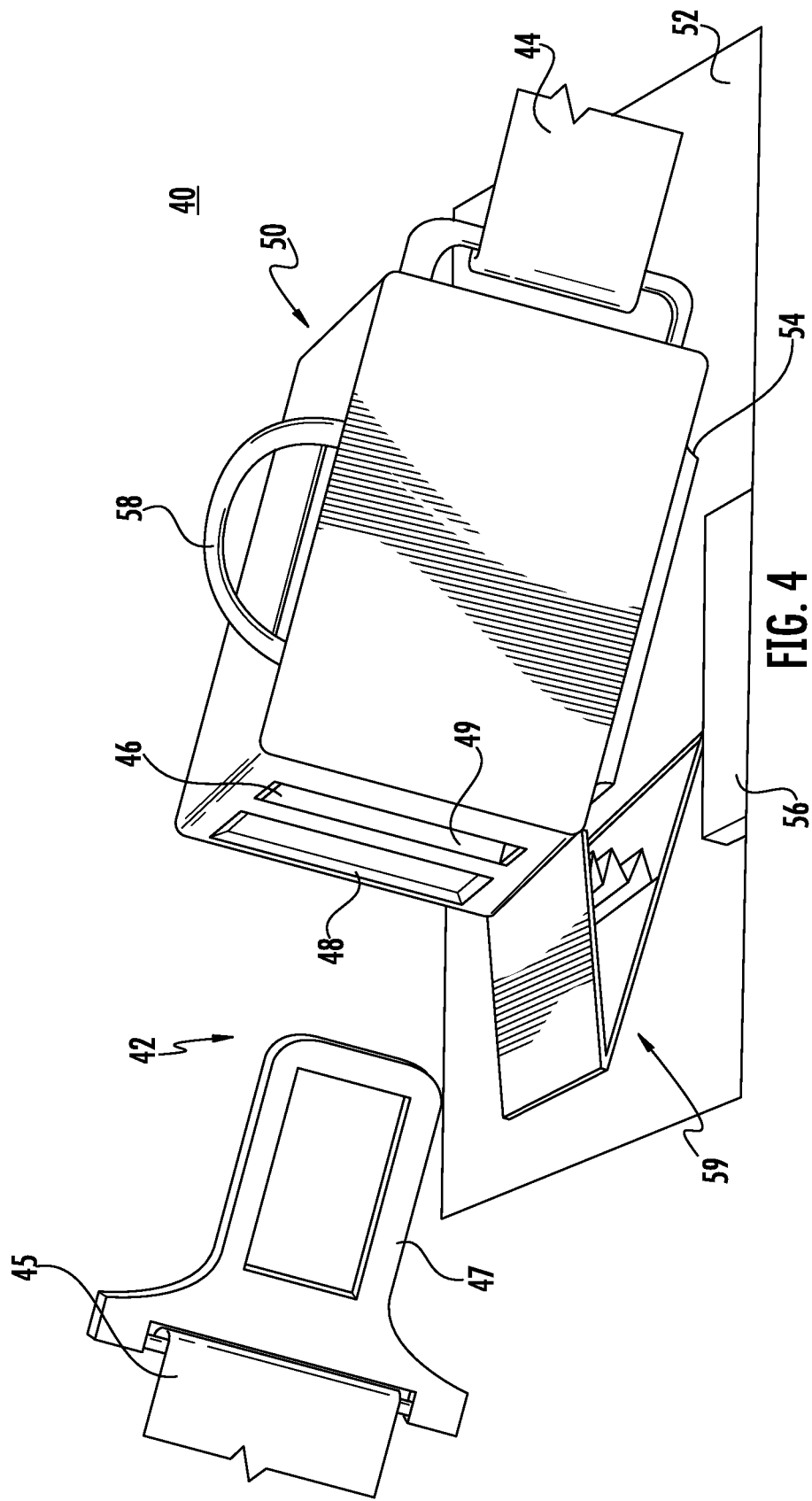

SEATBELT LIFT MEMBER AND METHOD

CROSS-REFERENCE TO RELATED APPLICATIONS

This application claims the benefit of U.S. Provisional Patent Application No. 61/880,085, filed 19 Sep. 2013.

FIELD OF THE INVENTION

This invention relates to vehicle accessory devices and more particularly, the present invention relates to accessories for seatbelt modification.

BACKGROUND OF THE INVENTION

At the present time, seat belts in vehicles, and especially the rear seat of automobiles, can be very inconvenient. In many instances the buckles have a tendency to fall down between the seat cushion and the back cushion. Even when provided with a well in the seat for storing the buckles, they can be hard to access.

It would be highly advantageous, therefore, to remedy the foregoing and other deficiencies inherent in the prior art.

Accordingly, it is an object of the present invention to provide a new and improved seat belt lift member.

It is another object of the present invention to provide a new and improved seat belt lift member that can be easily installed and leaves the seat belts convenient to use.

SUMMARY OF THE INVENTION

Briefly, to achieve the desired objects of the instant invention in accordance with a preferred embodiment thereof, a seat belt lift member is disclosed in cooperation with seat belts in an automotive vehicle including a vehicle seat having a seat belt well formed therein. A seat belt includes two pieces of strap with a buckle attached to one end of one piece, and the buckle positioned in the seat belt well. A seat belt lift member is positioned in the seat belt well in contact with the buckle so as to raise the buckle at least partially out of the seat belt well and into an accessible orientation. The seat belt lift member is one of a pliable body positioned in and conforming to the shape of the seatbelt well and a housing positioned in the seat belt well and mounting the buckle and a release button so as to be accessible from one surface of the housing.

BRIEF DESCRIPTION OF THE DRAWINGS

Specific objects and advantages of the invention will become readily apparent to those skilled in the art from the following detailed description of a preferred embodiment thereof, taken in conjunction with the drawings in which:

FIG. 4 is a perspective side view of another example of a seatbelt lift member of the present invention.

DETAILED DESCRIPTION OF A PREFERRED EMBODIMENT

Figure 1:
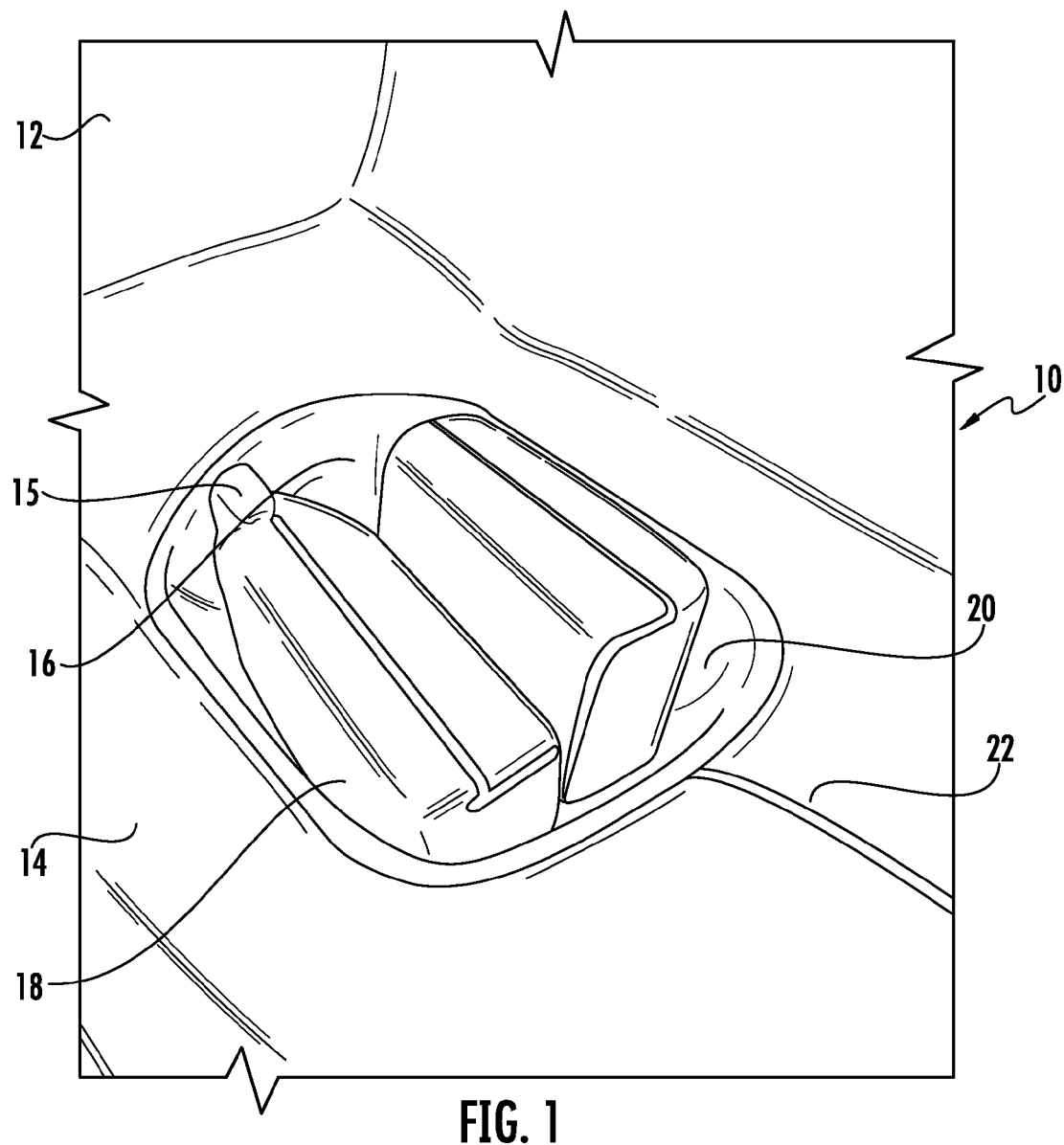
FIG. 1 is a perspective view of a seatbelt cluster in an automobile rear seat.

Turning now to the drawings in which like reference characters indicate corresponding elements throughout the several views, attention is directed to FIG. 1 which illustrates a rear seat 10 of an automobile having a seat back portion 12 and a seat bottom portion 14. A seatbelt cluster 15 of two seatbelts 16 terminating in seatbelt buckles 18 extend from the junction of seat back portion 12 and seat bottom portion 14. A seatbelt well 20 is formed in seat bottom portion 14 adjacent the junction of seat back portion 12 and seat bottom portion 14. Seatbelt well 20 is positioned and formed to receive seat belt cluster 15 therein in a retracted position so as to provide a continuous surface 22 to seat bottom portion 14 without seat belts 16 extending upward past surface 22. This allows users to slide onto seat bottom portion 14 without being interrupted by seatbelts 16. When in use, seatbelt 16 is pivoted upwardly to a raised position so that buckle 18 extends past surface 22 for ease of access. As is well known, a second portion of seatbelts 16 (see FIG. 4) includes a fastener receivable by buckles 18. Seatbelts 16 pivot upwardly to permit a user to insert the fastener into buckles 18.

Figure 2:
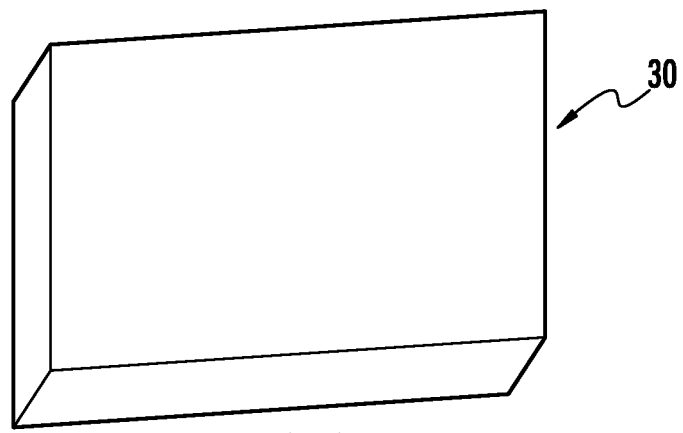
FIG. 2 is a perspective view of a seatbelt lift member of the present invention.
Figure 3:
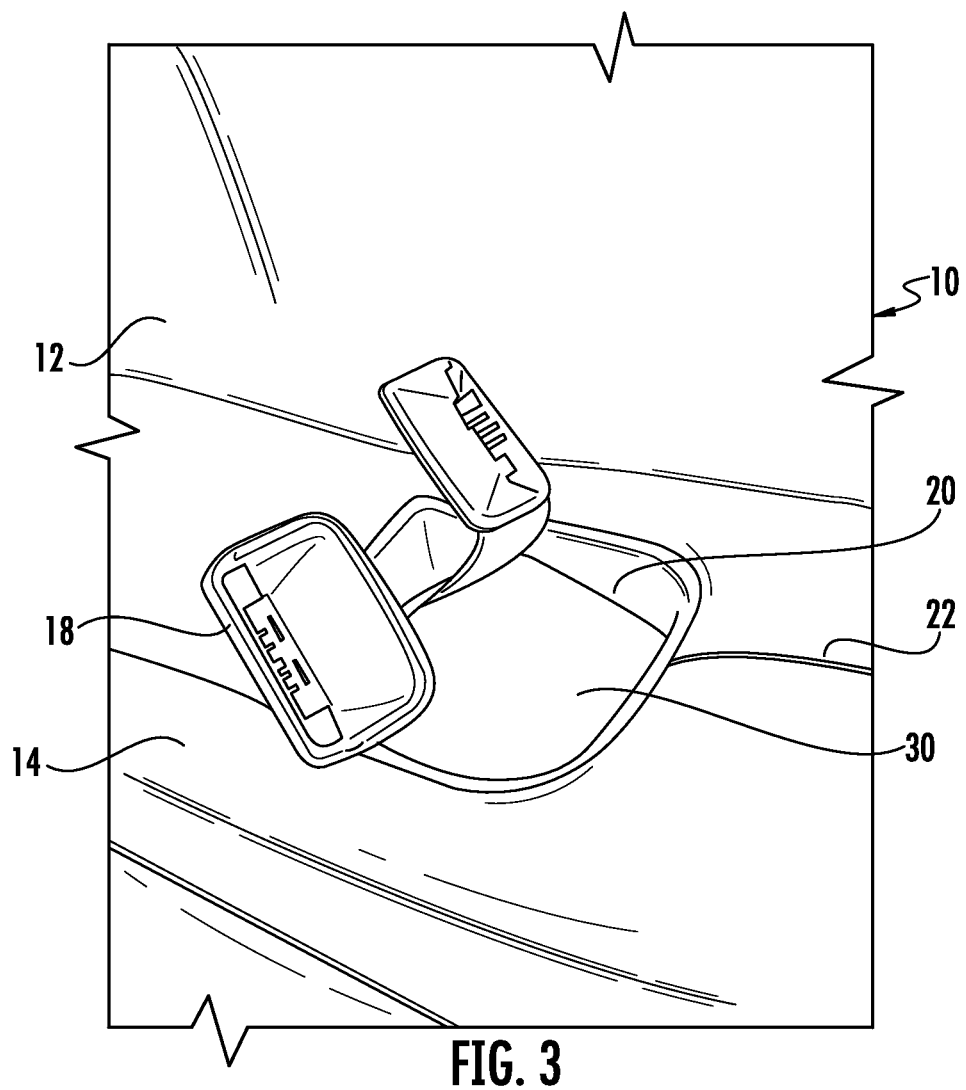
FIG. 3 is a perspective view of the seatbelt cluster in an automobile rear seat with the seat belt lift member positioned in accordance with the present invention.

While effective when a person desires to slide onto seat bottom portion 14, when items such as child restraint seats or car seats are used, it can be difficult to access the seatbelt buckles 18, which must be dug out from the seatbelt well 20. Often, fingers and fingernails can be damaged in the process. To facilitate access to the seatbelt buckles 18, a rectangular seat belt lift member 30, illustrated in FIG. 3, constructed of pliable material such as foam, foam rubber, rubber and the like is inserted into seatbelt well 20 as illustrated in FIG. 2.

The process of insertion begins with pivoting seatbelt cluster 15 upwardly toward seat back portion 12 (See FIG. 2) and inserting seat belt lift member 30 into seatbelt well 20. Seat belt lift member 30 is a pliable body of material to allow some distortion, thereby conforming to the shape of seatbelt well 20 and pressing against seatbelts 16. With seat belt lift member 30 filling seatbelt well 20, seatbelt cluster 15 is maintained in a raised position above surface 22. This allows access to seatbelt buckles 18 without the need for moving each seatbelt 16 from the retracted position to the raised position. When not in use, seat belt lift member 30 can be easily removed and stored for later use as desired. It will be understood that while seat belt lift member 30 is preferably rectangular in shape, other shapes are contemplated such as oval triangular and the like, to fit into the well of various different makes and models of existing automobiles. Furthermore, the texture and color can be adjusted to match with the automobiles interior or simply subject to the user's choices.

Turning now to FIG. 4 another example of a seat belt lift member, generally designated 40, is illustrated. A standard seat belt 42 is included which consists of two pieces 44 and 45 of strap. Strap piece 44 is fixedly attached to the vehicle at one end (not shown) through the seat cushions in a well-known fashion and the other end has a buckle 46 attached. Strap piece 45 has one end attached to the vehicle (not shown) and the other end has a fastener 47 fixedly attached thereto. As is known, buckle 46 has a fastener receiving opening 49 formed therein and is internally constructed to lock fastener 47 in fastener receiving opening 49 until released by pressing a release button 48 attached to buckle 46 and positioned adjacent fastener receiving opening 49.

In this example, a generally box-shaped housing 50 is provided with buckle 46 and button 48 mounted therein. Buckle 46 is positioned in housing 50 so that opening 49 is accessible through the front and strap 44 exits through the rear. Also, button 48 is positioned in housing 50 so as to be accessible through the front. Housing 50 is designed to be stored in a convenient location, for example in seatbelt well 20 (see FIG. 1) or a similar type opening designated 52. In this example housing 50 has a metal plate 54 attached to the bottom surface and a magnet 56 is attached to a surface approximately 2 inches below the surface of the seat. Thus, magnet 56 holds housing 50 in opening 52 in a stored or non-use position. A folding pull-up handle 58 is attached to the upper surface of housing 50 and provides easy access to the front of housing 50.

In this example, housing 50 is approximately three inches long (front to back), approximately two inches deep (top to bottom), and approximately one and one fourth inches wide. These dimensions are simply for exemplary purposes and it will be understood that different dimensions may be involved for different makes and types of seat belts. However, it will be understood that the depth of housing 50 is approximately the same depth as seat belt well or opening 52 so that in the stored position the upper surface of housing 50 is approximately flush with the upper surface of the seat. Also, housing 50 can be constructed of virtually any convenient material, such as plastic, metal, hard fibrous material, etc. Alternatively, at least the upper surface of housing 50 can be covered with material having a texture and color that can be adjusted to match with the automobiles interior. In this fashion, housing 50 can be provided relatively inexpensively and convenient for use in virtually any vehicle. Folding pull-up handle 58 is generally flush with the upper surface of housing 50 but is constructed to be easily accessible from the stored position. An optional spring 59 is attached to the lower edge of the front of housing 50 so that it holds the front of housing 50 in an upwardly directed orientation with button 48 and fastener receiving opening 49 completely accessible.

In a stored or non-use orientation, housing 50 is held in seat belt well or opening 52 by metal plate 54 and magnet 56. It will be understood that other devices or releasable structures might be used for this purpose as, for example, VELCRO hook-and loop fasteners or other hook-and-loop apparatus. When it is desired to use seat belt 42, handle 58 is lifted and housing 50 is moved until it is released from the apparatus holding it in the well or opening. If included, once housing 50 is released, spring 59 holds it in the accessible position and fastener 47 can be easily inserted into fastener receiving opening 49. Also, in this orientation button 48 is readily accessible for disconnecting fastener 47 from fastener receiving opening 49.

Thus, it will be understood that new and improved seat belt lift members have been disclosed that can be easily installed and that leave the seat belts convenient to use. Also, the new and improved seat belt lift members can be fabricated in a wide variety of shapes and sizes and using a wide variety of materials so that they are highly adaptable, convenient and easy to install and use.

Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A seat belt lift member in cooperation with seat belts in an automotive vehicle comprising:
    a vehicle seat having a seat belt well formed therein;
    a seat belt including two pieces of strap with a buckle attached to one end of one piece, and the buckle positioned in the seat belt well;
    a seat belt lift member positioned in the seat belt well in contact with the buckle so as to raise the buckle at least partially out of the seat belt well and into an accessible orientation, wherein the seat belt lift member includes a housing with the buckle mounted therein and accessible from one surface; and
    a handle attached to the housing and accessible externally to at least partially lift the housing out of the seat belt well.

2. The seat belt lift member in cooperation with seat belts in an automotive vehicle as claimed in claim 1 wherein at least the upper surface of the housing is covered with material having a texture and color adjusted to match with the vehicle seat.

3. The seat belt lift member in cooperation with seat belts in an automotive vehicle as claimed in claim 1 further including a releasable structure positioned in the seat belt well and releasably attached to the housing and holding the housing in the seat belt well.

4. The seat belt lift member in cooperation with seat belts in an automotive vehicle as claimed in claim 3 wherein the releasable structure includes a metal plate mounted on one of the vehicle seat and the housing and a mating magnet mounted on another of the housing and the vehicle seat.

5. The seat belt lift member in cooperation with seat belts in an automotive vehicle as claimed in claim 3 wherein the releasable structure includes a hook-and-loop fastener.

6. The seat belt lift member in cooperation with seat belts in an automotive vehicle as claimed in claim 1 further including a spring in contact with the housing so as to raise the housing at least partially out of the seat belt well and into an accessible orientation.

7. A seat belt lift member in cooperation with seat belts in an automotive vehicle comprising:
    a vehicle seat having a seat belt well formed therein;
    a seat belt including two pieces of strap with a buckle attached to one end of one piece and a release button attached to the buckle and positioned adjacent the buckle;
    a housing with the buckle and the release button mounted therein and accessible from one surface of the housing, the housing positioned in the seat belt well; and
    a releasable structure positioned in the seat belt well and releasably attached to the housing and holding the housing in the seat belt well.

8. The seat belt lift member in cooperation with seat belts in an automotive vehicle as claimed in claim 7 wherein the releasable structure includes a metal plate mounted on one of the vehicle seat and the housing and a mating magnet mounted on another of the housing and the vehicle seat.

9. The seat belt lift member in cooperation with seat belts in an automotive vehicle as claimed in claim 7 wherein the releasable structure includes a hook-and-loop fastener.

10. The seat belt lift member in cooperation with seat belts in an automotive vehicle as claimed in claim 7 further including a handle attached to the housing and accessible externally to at least partially lift the housing out of the seat belt well.

11. The seat belt lift member in cooperation with seat belts in an automotive vehicle as claimed in claim 7 further including a spring in contact with the housing so as to raise the housing at least partially out of the seat belt well and into an accessible orientation.

12. A seat belt lift member in cooperation with seat belts in an automotive vehicle comprising:
    a vehicle seat having a seat belt well formed therein;
    a seat belt including two pieces of strap with a buckle attached to one end of one piece and a release button attached to the buckle and positioned adjacent the buckle;

a housing with the buckle and the release button mounted therein and accessible from one surface of the housing, the housing positioned in the seat belt well;

a handle attached to the housing and accessible externally to at least partially lift the housing out of the seat belt well;

a releasable structure positioned in the seat belt well and releasably attached to the housing and holding the housing in the seat belt well; and a spring in contact with the housing so as to raise the housing at least partially out of the seat belt well and into an accessible orientation once the releasable structure is released.

* * * * *